US012790554B2

(12) United States Patent
Lloyd et al.

(10) Patent No.: US 12,790,554 B2
(45) Date of Patent: Nov. 10, 2026

(54) LIQUID-LIQUID EXTRACTION OF HYDROCARBONS IN BULK STORAGE TANKS

(71) Applicant: MACQUARIE COMMODITIES TRADING US, LLC, Houston, TX (US)

(72) Inventors: Monica Lloyd, Dickinson, TX (US); Aaron Kildow, Houston, TX (US); Vikas Dwivedi, Houston, TX (US); Virginia Flippin Green, Houston, TX (US)

(73) Assignee: Macquarie Commodities Trading US, LLC, Houston, TX (US)

( * ) Notice: Subject to any disclaimer, the term of this patent is extended or adjusted under 35 U.S.C. 154(b) by 518 days.

(21) Appl. No.: 17/725,393

(22) Filed: Apr. 20, 2022

(65) Prior Publication Data

US 2022/0267683 A1 Aug. 25, 2022

Related U.S. Application Data

(63) Continuation of application No. 17/181,559, filed on Feb. 22, 2021.

(51) Int. Cl.
*C10G 19/02* (2006.01)
*B01D 11/04* (2006.01)
(Continued)

(52) U.S. Cl.
CPC .............. *C10G 19/02* (2013.01); *B01D 11/04* (2013.01); *B01D 11/0419* (2013.01);
(Continued)

(58) Field of Classification Search
None
See application file for complete search history.

(56) References Cited

U.S. PATENT DOCUMENTS

| | | | |
|---|---|---|---|
| 43,325 | A | 6/1864 | Merrill |
| 1,968,842 | A | 8/1934 | Malisoff |

(Continued)

FOREIGN PATENT DOCUMENTS

| | | |
|---|---|---|
| GB | 556606 | 10/1943 |
| WO | 2002018519 A1 | 3/2002 |

(Continued)

OTHER PUBLICATIONS

International Search Report and Written Opinion mailed Jul. 12, 2022 in corresponding PCT Application No. PCT/US22/25909.

(Continued)

*Primary Examiner* — Peter Keyworth
(74) *Attorney, Agent, or Firm* — Hogan Lovells Cadwalader US LLP

(57) ABSTRACT

Described herein are methods and systems for performing liquid-liquid extraction in bulk tankage. According to certain embodiments, the liquid-liquid extraction can occur in a bulk tank via a circulation loop, in which a solvent mixture is injected with the hydrocarbon ahead of mix valves on the circulation loop. According to other embodiments, a misting system is installed in the vapor or head space of bulk tankage. The misting system distributes small micro-drops of a solvent mixture so as to cause a uniform lay down over the entire top surface area of hydrocarbon. The solvent mixture migrates from the top surface of the hydrocarbon to the bottom of the bulk tank, reacting during migration to cause liquid-liquid extraction.

16 Claims, 1 Drawing Sheet

(51) Int. Cl.

| | |
|---|---|
| ***C10G 5/04*** | (2006.01) |
| ***C10G 21/16*** | (2006.01) |
| ***C10G 61/04*** | (2006.01) |

(52) U.S. Cl.

CPC ...... *B01D 11/0473* (2013.01); *B01D 11/0492* (2013.01); *C10G 5/04* (2013.01); *C10G 21/16* (2013.01); *C10G 61/04* (2013.01); *C10G 2300/203* (2013.01); *C10G 2300/206* (2013.01); *C10G 2300/208* (2013.01)

(56) References Cited

U.S. PATENT DOCUMENTS

| | | | | | | |
|---|---|---|---|---|---|---|
| 1,983,220 | A | | 12/1934 | Fields | | |
| 2,336,589 | A | | 12/1943 | Bonotto | | |
| 2,360,861 | A | | 10/1944 | Pierotti | | |
| 2,424,158 | A | | 7/1947 | Fuqua | | |
| 2,911,360 | A | * | 11/1959 | Myers | C10G 19/00 | 208/263 |
| 3,718,319 | A | * | 2/1973 | Weisman | B01D 11/04 | 366/173.1 |
| 4,510,047 | A | | 4/1985 | Thompson | | |
| 4,673,484 | A | | 6/1987 | Babcock | | |
| 5,182,024 | A | | 1/1993 | Chen | | |
| 5,199,978 | A | | 4/1993 | Poirier | | |
| 5,961,821 | A | | 10/1999 | Varadaraj | | |
| 2008/0209799 | A1 | | 9/2008 | Woods | | |
| 2008/0277354 | A1 | * | 11/2008 | Baerheim | B63J 4/002 | 210/764 |
| 2008/0314758 | A1 | | 12/2008 | Grosso | | |
| 2011/0266198 | A1 | * | 11/2011 | Hassan | B03D 1/247 | 196/46 |
| 2012/0152807 | A1 | | 6/2012 | McFarlane | | |
| 2013/0037448 | A1 | | 2/2013 | Al-Hajji | | |
| 2013/0082003 | A1 | * | 4/2013 | Bajpayee | B01D 11/0488 | 210/695 |
| 2021/0261871 | A1 | | 8/2021 | Lloyd et al. | | |

FOREIGN PATENT DOCUMENTS

| | | | | | |
|---|---|---|---|---|---|
| WO | 2002099013 | A2 | | 12/2002 | |
| WO | WO-2017165963 | A1 | * | 10/2017 | B01D 17/06 |

OTHER PUBLICATIONS

Graham R. Lobley et al., “Caustic Cracking: Incidents in Refineries,” Jan. 2007, Corrosion Control, vol. 007, Paper 080, pp. 1-7.

* cited by examiner

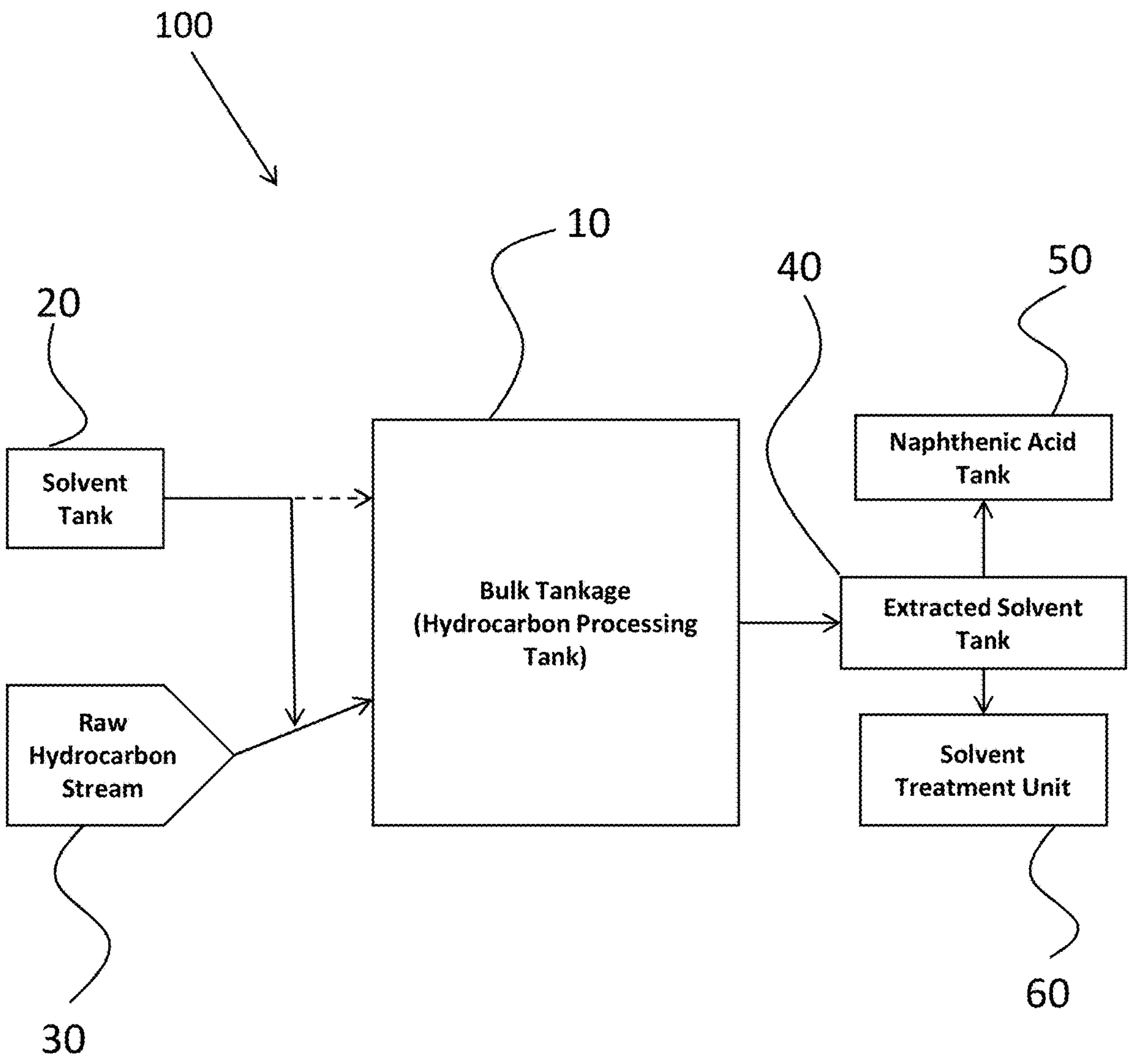
100
10
20
40
50
Solvent Tank
Naphthenic Acid Tank
Bulk Tankage (Hydrocarbon Processing Tank)
Extracted Solvent Tank
Raw Hydrocarbon Stream
Solvent Treatment Unit
60
30

LIQUID-LIQUID EXTRACTION OF HYDROCARBONS IN BULK STORAGE TANKS

CROSS-REFERENCE TO RELATED APPLICATIONS

This application is a continuation of U.S. application Ser. No. 17/181,559, filed on Feb. 22, 2021. The aforementioned application is hereby incorporated by reference in its entirety.

FIELD OF THE INVENTION

Described herein are embodiments of liquid-liquid extraction processes for use with hydrocarbons in bulk storage tanks, and embodiments of systems to perform such processes.

BACKGROUND OF THE INVENTION

Liquid-liquid extraction is a separation process for isolating the constituents of a liquid mixture. The process involves extracting a solute from a solution by bringing it into contact with a second immiscible solvent in which the solute is soluble. It is, generally speaking, an established process, and together with distillation, the two processes are regularly practiced industrial separation procedures. Whereas distillation causes separation by utilizing the differing volatilities of the components of a mixture, liquid-liquid extraction causes separation by using a particular solvent (or mixture of solvents) to partition immiscible components.

The petroleum industry utilizes liquid-liquid extraction to separate, for example, different types of hydrocarbons using solvents such as liquified sulfur dioxide, furfural and diethylene glycol. In general, extraction is applied when the materials to be extracted are heat-sensitive or nonvolatile and when distillation would be inappropriate because components have similar boiling points, have poor relative volatilities, or form azeotropes.

One example of a simple extraction operation is single-contact batch extraction, in which the initial feed solution is agitated with a suitable solvent, allowed to separate into two phases, and then the solvent containing the extracted solute is decanted. On an industrial scale, the extraction operation typically involves more than one extraction stage and is normally carried out on a continuous basis. The equipment may be comprised of either discrete mixers and settlers or some form of column contactor in which the feed and solvent phases flow counter-currently by virtue of the density difference between the phases. Final settling or phase separation is achieved under gravity at one end of the column by allowing an adequate settling volume for complete phase separation. Such extraction operations are most typically performed in process units, with the hydrocarbon moving through the unit. There is a void in industry for performing liquid-liquid extraction on static hydrocarbons that are stored in bulk tankage.

Naphthenic Acid has been a nemesis throughout the refining process for years. Typically, the majority of acids present in a hydrocarbon feed are naphthenic acids (a subset of carboxylic acids). They generally have high total acid numbers ("TAN") and are oil soluble. These characteristics cause various problems in the refining process.

At a crude distillation unit, for example, caustic washes that react with naphthenic acids convert the carboxylic acids into naphthenates, which can create severe emulsions in the desalting units. Such emulsions can greatly decrease desalting efficiency and often minimize throughput to the entire distillation unit. This leaves refiners with a choice of two undesirables: do not run high naphthenic acid crudes at all or minimize the relative percentage of high naphthenic acid crudes in the overall blend. These would be the options in order for the desalting units to maintain efficiency. Crude oil itself (not high naphthenic acid crudes) typically has naphthenates existing in its composition, most commonly in the form of calcium naphthenates or sodium naphthenates—they may exist in the structure of iron, copper, and magnesium as well.

The majority of naphthenic acids typically reside in the heavier cuts of crude—because the majority of naphthenic acids are a heavier molar weight, they tend to end up in the bottom cuts of the crude. Accordingly, refiners may struggle with elevated corrosion in the bottom portions of their atmospheric columns and vacuum columns (typically where the heavier cuts reside) due to naphthenic acid finding its way to those portions of such columns and processing units. These problems can be exacerbated in systems that lack suitable caustic washing processes. Refiners must also limit their blend of crude feedstocks in order to minimize TAN in heavy fuels that would trigger a discount to the sales price (fuel must be blended to meet the upper threshold of a maximum 2.5 TAN).

By extracting the naphthenic acid in bulk tankage according to the inventive embodiments described herein, refiners can remove or lower the TAN of the virgin crude initially, before it is refined, which minimizes (or even eliminates) downstream processing and the above-stated problems. Implementing the systems and methods described herein, refiners can extract naphthenic acid and lower TAN from heavy fuel cuts in product tanks, which is can eliminate the excess TAN discount they otherwise would be forced to take. There is a void in industry for removing naphthenates and naphthenic acid from static hydrocarbon stored in bulk tankage, before downstream processing and without traditional refinery operations.

Sulfur is another nemesis for refineries. Sulfur specifications for all fuels are continually tightening, requiring further removal of sulfur in order for refiners' products to meet global governmental requirements. The traditional technology for sulfur removal is a hydrotreater, a mechanism configured to perform hydrotreating, or the reaction of organic compounds in the presence of high pressure hydrogen to remove oxygen and other heteroatoms, like sulfur. They are expensive units to build and operate, requiring not only the hydrotreater itself for sulfur removal, but also a hydrogen plant and downstream sulfur recovery unit. Hydrotreaters are product specific and are effective on the lighter cuts of oil, such as naphtha, kerosene, diesel, and gas oil, but fairly ineffective on heavier cuts.

Technology for hydrotreating heavier cuts is limited. There is no current technology to remove sulfur from the crude before it is refined. Thus, a refiner's choices for a crude slate are often very limited by the sulfur content of the crude and their hydrotreater limitations. In addition, new international laws have placed lower sulfur limits on heavier fuels, such as bunker fuels. As a result, there is an increased need for new sulfur removal technologies. Removing or reducing sulfur from the crude initially, would provide refiners a greater selection of crudes without overtaxing downstream hydrotreaters.

Some crude slates are known bad actors for desalting. Due to various compounds, they are either difficult to desalt in a classic desalter or they have extreme high levels of water initially that is emulsified. High water levels in crude causes throughput issues for the crude unit and increased downstream corrosion due to desalter inefficiency. Desalters add fresh water to solubilize salts. Even crudes that are dewatered before being refined will take up water again in a desalter. Desalting and dewatering in tankage will resolve throughput and corrosion issues derived from these types of crudes. There is a need for a mechanism, apparatus, or system to improve desalting—indeed, to completely desalt crudes while minimizing water consumption and outfall.

In liquid-liquid extraction, the problem of what to do with the resulting off-spec liquid being used for extraction is always an issue. With amines, they must be stripped with the extracted material removed. Disposal of water or solvent is expensive and can become an insurmountable issue because of environmental restrictions. Most refineries and terminals are already reaching limits on outfall permits for quantity and biochemical oxygen demand ("BOD") and chemical oxygen demand ("COD"). Disposal of any quantity of water or solvent becomes an economic hurdle that would render the process not viable.

Asphaltenes are another common type of material that plague refineries. Most crudes have some level of measurable asphaltenes (the percentage that are insoluble in n-heptane). Asphaltenes are long chained molecules that have a polar tail, making them slightly incompatible with the other constituents of crude oil. They can cause havoc from production, transport, storage, and refining because of their capacity to flocculate. Asphaltenes are highly viscous and rich in sulfur, metals (in particular vanadium and nickel, complexed metals with little capacity to form salts) and nitrogen. Due to their polar tails, they cause emulsion issues at desalters, as they migrate to the water/oil interface and accumulate, resulting in oil undercarry and water overcarry into the crude unit heaters and main fractionator. Asphaltenes are a main source of fouling in crude preheat and vacuum units due to their tendency to create depositions within the exchangers.

Currently, refinery de-asphalting processes take place on residue streams, but the material in the streams must go through the crude pre-heat, desalters, a main fractionation unit, and a vacuum unit before it arrives at a location where de-asphalting can effectively occur. This allows the asphaltenes to cause operational issues on said units, as well as other downstream units. Regarding downstream units, asphaltenes can migrate up the tower into higher cuts, affecting such downstream units and the catalyst—the catalyst, in particular, being sensitive to nitrogen and metal. Further, asphaltenes tend to be rich in phenols, naphthalenes, and other defined polycyclic aromatic hydrocarbons (PAHs). Such materials are well known health hazards, as they have polar constituents that are water soluble and can leach into the water table. After vacuum residue goes through a de-asphalting unit, it undergoes an air-blowing operation to oxidize the asphalt. One of the primary reasons for doing so is to minimize the PAHs before the asphalt can be marketed for commercial purposes. Air blowing of asphalt is a major source of greenhouse gas emissions.

Until now, there has been limited technology to extract undesirable materials, such as naphthenic acid, asphaltenes, metals, hydrogen sulfide, and mercaptans, from hydrocarbon in bulk tankage. The industry is therefore lacking and desirous of systems and methods for stripping these materials from hydrocarbon (e.g., crude stock) before or during transit to a refinery and downstream processing plants, or upon arriving at a processing site, without having to use traditional distillation methods.

SUMMARY OF THE INVENTION

Embodiments described herein are directed to methods of performing liquid-liquid extraction in bulk tankage, and systems to facilitate the same. Embodiments of the present invention are designed to treat hydrocarbon in bulk tankage (e.g., storage tanks) while the hydrocarbon is statically contained in the bulk tankage (e.g., at the hydrocarbon extraction site, in transit between extraction and refineries or downstream processing sites, or at a refinery but before undergoing traditional refinery processing operations). Treatment of the hydrocarbon in the bulk tankage typically occurs in batch processes. As described in more detail below, in certain embodiments, circulation loops are on, attached to, or otherwise incorporated with the tankage. These circulation loops are configured to insert/inject solvent mixtures comprising, e.g., one or more alcohol(s), water, glycerin and potentially other materials. The solvent mixtures react with the hydrocarbon to extract an array of undesirable materials from the hydrocarbon, including naphthenic acid, asphaltenes, phenols, hydrogen, oxygen, nitrogen, hydrogen sulfide and mercaptans, chlorides, sulfur, and water soluble salts and/or metals as well as complexed metals such as vanadium and nickel. After being injected in the bulk storage tank and reacting with the hydrocarbon, the solvent eventually is decanted and "drops out," at which point it can be pumped out of the bulk storage tank to a solvent recovery tank. There, the solvent is acidized and then cycled through external reverse osmosis systems to remove metals and soluble salts to allow clean solvent to be recycled and reused.

According to one embodiment, liquid-liquid extraction can occur via a circulation loop in which a solvent mixture (e.g., comprising water, alcohol(s), and/or glycerin/glycerol) dosed or combined with caustic is injected with the hydrocarbon ahead of mix valves on the circulation loop. The solvent mixture may be infused with the hydrocarbon input to form a single input stream or injected independently and simultaneously with the hydrocarbon. Additionally, a sparging system may be installed in the bottom of the tank comprising vortexing nozzles. Thus, in certain embodiments, the circulation loop is located on or integrated with the bulk storage tank (a processing tank in the sense the liquid-liquid extraction is carried out in said tank). Solvent mixtures may be inserted/injected into the crude via the circulation loop and sparging system to allow for contact between the solvent and hydrocarbon. In some embodiments, heat is used in the process. To facilitate that, heat exchangers may be installed on the circulation loop or heaters may be installed in the bottom of the tank to supply necessary heat. An embodiment may also include an elevated high draw, which will cause the hydrocarbon to be exposed to the solvent mixture more quickly. While systems and methods described herein may refer to the storage and processing of crude oil, it should be understood that the embodiments of the present invention are effective with all types of hydrocarbon (e.g., all types of crude, vehicle fuels, lubricating oils, bunker oils etc.).

According to another embodiment, a misting system is installed in the vapor space or head space of the bulk tankage. The misting system creates small micron drops of a solvent mixture that "lay down" over the entire top surface area of the hydrocarbon and migrates through the hydrocarbon, reacting as it falls to the bottom of the tank where it is pumped off from the sump.

In order to facilitate liquid-liquid extraction in fuel oil or hydrocarbons with an extremely low American Petroleum Institute ("API") gravity, one embodiment comprises a sparging system that can utilize steam along with the solvent that has a higher vapor point. Although most chemistries added to the steam in accordance with this invention have a vapor point higher than 212° F., the steam provides a distribution system as well as the water source to combine with the solvent for the extraction to occur. The steam and solvent mixture condenses once it is injected into the tank and rises to the top, where high draws allow for the water and solvent to be removed.

Embodiments of the systems described herein have been found to be particularly effective for liquid-liquid extraction of: (1) naphthenic acid from hydrocarbon; (2) sulfur from hydrocarbon; and (3) water soluble salts or metals (4) asphaltenes and the constituents that are heavily enriched in said asphaltenes. And, according to certain embodiments, once acid, sulfur, asphaltenes, and salts are removed, extracted naphthenates can be converted back to naphthenic acid for sale, extracted sulfur can be resold, extracted asphaltenes can be marketed to various commercial outlets and extracted flocculate salts may be properly disposed. Moreover, the water/solvent mixture used for liquid-liquid extraction can be re-used within the process. Certain other embodiments utilize ultrasonic sound waves, either initially, or throughout the extraction process. Doing so excites molecules, which can expedite reactions.

According to another embodiment of the present invention, a method of liquid-liquid extraction comprises several steps. In the first step, it is important to understand the compositional makeup of the mixture. It is advisable to check for certain physical properties, such as API gravity, total metals (with particular attention to metals that have the potential to become salts or metal soaps, such as sodium, calcium, magnesium, potassium, iron), total acid number ("TAN"), percent (%) asphaltenes, and viscosity. This initial step further comprises determining and measuring the total volume of hydrocarbon coming into the system or bulk tankage. In certain embodiments, an additional initial acid/solvent washing step may be performed to convert metal naphthenates into naphthenic acid in order to allow the metals to drop out with the solvent. This step may be useful, for example, when metal levels (e.g., calcium levels) are extremely high.

The second step of this exemplary embodiment is to calculate the dosage of caustic chemistry (e.g., potassium hydroxide (KOH) or sodium hydroxide (NaOH) solution) to be dosed/injected into the solvent for the solvent washing step. Using KOH or NaOH, dose the caustic at 1,000 ppm per every point of total acid. As KOH is slightly weaker, it can require a stronger dose than if utilizing NaOH. A simple lab dosage of hydrocarbon being stirred with the caustic and a check of total acid will confirm proper dosage amount. For example: A TAN of 5.0 would require a dosage of 5,000 ppm of caustic.

The third step of this exemplary embodiment is to combine caustic-dosed solvent and hydrocarbon. The use of caustic to neutralize acids (which are most likely naphthenic acids) will form metal soaps, which tend to create severe emulsions. Water alone is not effective in extracting acids without also extracting hydrocarbon. Rinsing the oil with a solvent of water and alcohols allows for the extraction of metal soap without extracting hydrocarbon other than hydrocarbons specifically targeted such as asphaltenes or PAHs that are also targeted due to their polarity issues. Many alcohols are effective. For example, a solvent recipe may comprise 30-50% alcohol(s), 20-40% water, 20-40% glycerin/glycerol may be used (% by weight), where one useful solvent mixture comprises 40 wt. % ethanol, 30 wt. % water, and 30 wt. % glycerin/glycerol. Ethanol provides for a cleaner, more efficient extraction of soaps, as compared to water and glycerin alone. Glycerin/glycerol in the solvent combination is useful in order to provide a solvent gravity that is heavy and desires to drop out of the hydrocarbon in tankage.

Generally, the solvent-to-oil ratio may be 10:50 by mass, or alternatively 20:40 by mass. In certain embodiments, the solvent can be blended with the hydrocarbon on the run-down from a ship or barge or on a circulation loop after hydrocarbon is in the tank. In certain embodiments, the caustic can be injected neat into the crude or pre-dosed into the solvent. Pre-dosing caustic into the solvent may provide benefits of better distribution and contact.

In this step, according to certain embodiments, the solvent, hydrocarbon, and caustic are circulated together for at least 6 hours, advantageously at least 12 hours up to and including 24 hours, to allow for full contact of acids and caustic. It may be useful to periodically check the TAN of the solvent/hydrocarbon mixture to determine if full reaction has taken place. For a full reaction, the TAN will be non-detectable or a minimal value. Reaction and separation happen regardless of temperature and can be performed at ambient conditions. Notwithstanding this, circulation can also occur under elevated heated conditions. Slight amounts of heat (no more than 150° F., due to boiling points of alcohols, for example) can facilitate more efficient blending and separation because elevated temperatures lower the viscosity of the hydrocarbon. After enough contact has taken place, circulation stops and the tank is allowed to become sedentary.

At this point in the process, the solvent will immediately begin to drop and separate from the hydrocarbon. Once approximately 30% of the solvent has separated, the solvent/metal soap can begin to be pumped off to treatment skids (or treatment tanks). It is expected that total solvent drop out will take approximately 24 hours. The metal soap content expected to be recovered is approximately 0.1% to 15.0% of crude volume per point of TAN. In addition, if original metals (e.g., sodium or calcium) are present in excessive quantities, then it may be assumed that there was a pre-existing metal soap present, which will increase volume per the ppm reported. After solvent has been removed, total metals, pH of oil and water, percent (%) asphaltenes and TAN should be rechecked.

The fourth step in this exemplary embodiment is an optimization step and depends on one's ultimate goal. For instance, one process goal may be to completely remove soap or ultimate resulting naphthenic acids or asphaltenes. In that scenario, evaluating the level of total metals or % asphaltenes after solvent rinse will indicate how much of the metal soaps or asphaltenes were not picked up and extracted in first rinse. Generally, a sodium, potassium, or calcium number would be in the 100 to 300 ppm range. If the optimization goal is to completely remove soap or additional removal of soap and asphaltenes, then one or more additional solvent rinses may be required. The pH of oil will be high, but most likely not high enough for the soap to be in the range that the soap will cause an emulsion.

According to an embodiment, to remove soap entirely, an additional solvent rinse comprises dosing the solvent with a small amount of caustic, enough to merely to bring the solvent pH above 11 so as to prevent the soap from forming a lather. Then, the procedure for contacting and settling of the solvent is repeated. The first pass results in the majority of both soaps as well as asphaltenes being extracted, however, every subsequent pass will result in a smaller level extracted until both quantities become trace levels.

In an alternative embodiment, where the optimization goal is to extract the metals from the solvent after the liquid-liquid extraction reaction with the hydrocarbon, a solvent wash with acid will be required in a solvent recovery unit, remote from the bulk tankage unit. After the liquid-liquid extraction occurs, the solvent (which now contains the undesirable materials, such as naphthenates and asphaltenes) is decanted and pumped out of the bulk tankage to a solvent recovery unit. There, the solvent is acid washed or acidized with strong acid. Exemplary strong acids that may be used include HCl or $H_2SO_4$. The acids break down the soaps, convert the metal soaps back to a naphthenic acid, and form metal salts that are solvent soluble.

The addition of acid can improve treatment. For example, recovered solvent can be injected with acid on its way to one or more settling tanks. The acid will immediately begin to convert the naphthenate soaps back into naphthenic acid as well as force the asphaltenes that were solubilized in the high pH solvent out of solution, which both will rise to the top of the processing tank no longer soluble with the solvent. It can take time to separate and fully convert naphthenate soap into naphthenic acid (at least 5 hours up to as many as 24 hours). For increased speed and efficiency, certain embodiments comprise multiple settling tanks and sheering mixers for closer contact between strong acids and soaps for reaction. The naphthalenes and phenols (PAHs) tend to remain in the solvent as opposed to migrating back with the naphthenic acids and asphaltenes, as they are readily soluble in alcohol, in particular ethanol. The reverse osmosis then captures them for recovery for value or BTU recovery at the thermal desorption units and removes them from the solvent bound for re-use within the process.

The acid-washed solvent then may be "recycled" through a bank of solvent treatment skids. Such skids may be advanced oxidation skids that, with an electrical charge and specialized catalyst plates, can convert the metal soaps back to naphthenic acid. Such converted naphthenic acid can be skimmed off, and any metal salts created can be precipitated out. This allows for the solvent recipe to be reused and recycled continuously. In other embodiments, solvent recycle may be treated using reverse osmosis skids comprising carbon filters or organic membranes to catch any crude or converted naphthenic acid that may have carried over. Reverse osmosis skids are effective for removing salts and chlorides and repairing solvents for reuse.

In certain embodiments, reverse osmosis ("R/O") equipment is used in lieu of oxidation skids. R/O skids "cycle up" the concentration of extracted constituents (e.g., metals, naphthalene, phenols, sulfur salts, and chlorides) in the solvent mixture. The cycled-up material can be sent directly to a cement kiln for recycling of the metals into cement (e.g., Portland cement). The alcohol and glycerin components of the solvent mixture, along with the naphthalenes and phenols, have BTU value. In addition, alcohol and glycerin are renewable fuels subject to monetary rebates when consumed for energy, as well as emissions tradeable credits. Thermal desorption burns will create energy and heat to self-sustain the nominal heat required to provide for the tankage heating options discussed herein.

According to certain embodiments, the extraction process utilizes an advanced oxidation water treatment facility, which, through oxidation via catalyst plates, is able to produce a water of potable quality or clean solvent. For example, sodium naphthenate that is extracted from the crude from exposing NaOH or KOH to the naphthenic acid is oxidized. That removes the Na, Ca, or other compound(s) that can convert the naphthenates back to the various molar weights of naphthenic acids. This enables continuous recycling for re-use in the liquid-liquid extraction. The advanced oxidation flocculates the material being extracted and recovers them as a saleable product or a concentrated material for safe disposal at an appropriate facility. The advanced oxidation also flocculates out the sulfur that is also extracted. The sulfur that is segregated can be sold into the raw sulfur industry where there is a wide variety of industrial uses. In other embodiments, this extraction process may, in addition to or in combination with the advanced oxidation equipment, utilize reverse osmosis skids, as mentioned above.

An acid step or acid wash may also be implemented in the oil reaction stage in the bulk tankage. Such embodiments comprise slowly adding acid to the solvent in an amount about or equal to (in ppm) the amount of metals remaining in the oil along with any level of basic nitrogen, followed by circulating the acidized solvent and hydrocarbon for about 12 to 24 hours. The acidized solvent converts metal soaps to metal salts, and the metals in the crude will have reduced, or trace, or nominal levels in the crude once solvent drops out. The basic nitrogen level of the crude will also drop as a result. A final polishing rinse with solvent might be necessary with no chemistry (e.g., without further dosing caustic or acid) to rinse any strong acids remaining in the oil. The level of strong acids in the crude can be monitored various ways: e.g., by measuring TAN and calculating strong acid levels, or if utilizing HCl as the strong acid, measuring total chloride level.

The systems and methods described herein may also be incorporated at upstream stages of hydrocarbon processing. The embodiments of the present invention described herein may be implemented during hydrocarbon transport (e.g., on a ship or vessel). In transit, circulation loop systems attached to or incorporated with the hydrocarbon bulk tankage can allow for initial contacting of solvent mixture and hydrocarbon, even before the hydrocarbon arrives at its destination (e.g., refinery). In this context, if the circulation loop systems are turned off or disconnected, the solvent mixture will drop out from the bulk tankage, allowing it to be removed and directed to solvent extraction tanks on site. The hydrocarbon in the bulk tankage will thus be "pre-treated" (e.g., naphthenic acid removed, asphaltenes removed, and water soluble salts or metals removed) all before being directed for further processing on site (e.g., at the refinery). Upstream stages where the embodiments of the present invention may be implemented include all types of transport (e.g., ship/barge or rail).

Furthermore, at the point of crude production or wellheads, specifically regional crudes that tend to consistently have same issues, this process can be applied at production to lessen the transport issues that ensue or mitigate the need at the refining location. For example, the embodiments described herein may be advantageous in "pre-treating" crudes that tend to run with high TAN, asphaltene, metals and nitrogen, such as North Sea naphthenic crudes and Canadian bitumen crude. The described extraction processes could be inserted in lieu of portions of the hot water washing methodology currently utilized for recovering bitumen from the oil sands. This could enable Canadian operations to recover the asphaltenes, naphthenic acids and PAHs at the origin of production for future commercial use, while sending the saturates, aromatics, and resins blended with condensate through various transportation methods onward to larger integrated refiners for further manufacturing.

Further, the processes described herein as opposed to just hot water are more effective in stripping the bitumen oil from the sands because of, among other things, the combination of alcohol and water possessing more stripping power. In addition, utilizing water alone leaves some residue of PAHs and naphthenic acids in the waters collected in tailing ponds. The inventive embodiments described herein provide a more complete removal of PAHs and naphthenic acids.

In certain embodiments, an additional feature is to distill the repaired solvent once it exits the reverse osmosis units. Bitumen crude contains large quantities of water that would increase ratio of water to alcohol to glycerol ratio. Recovery of alcohol and water as separate fractions allows for the recovery of alcohol and some level of water while outfalling unwanted yet clean water in order to maintain the correct ratios for solvent effectiveness.

Naphthenic acids have multiple uses in the industry, ranging from fuel additives to corrosion inhibitors to main ingredients for paint dryers and lumber treatment. The heavier molar weight naphthenic acids are highly sought after because they are difficult to extract from hydrocarbon. Embodiments of the present invention allow for extraction of naphthenic acids from crudes and heavy fuels, ranging in molar weight from very heavy to light. The various weight naphthenic acid may be sold to a naphthenic acid refiner who has the capabilities to further refine the acid into specific molar weight acid. In addition, as the naphthenic acids and asphaltenes are extracted together and must be gently distilled to separate, an on-site distillation facility for the separation of the majority of asphaltenes from lighter naphthenic acids can be installed or the entire mixture sent onward to consolidation facilities designed to separate the asphaltenes from acids and further upgrade both the naphthenic acids as well as the asphaltenes for commercial use.

Liquid-liquid extraction embodiments described herein are performed in bulk tankage in batch operation, with minimal amounts of equipment, and a relatively green carbon footprint. These embodiments can also be implemented in terminals for crude blends being shipped to refiners or on bunker or fuel oil blend-stocks being delivered from refiners. Using the embodiments described herein on the back end of the refinery on heavier cuts allows refiners to meet the new sulfur specifications without requiring them to develop, invest, and build new hydrotreater technology specific for heavy fuel. This also allows for heavy crudes to be treated in terminals and directed directly to market, bypassing refineries.

In practice, process engineers have typically separated and treated crude hydrocarbon by running (or moving) the hydrocarbon through refinery processing units (e.g., distillation columns, separators etc.). The embodiments described herein provide for separation and treatment without moving the crude hydrocarbon; rather, the separation and treatment can be performed on stationary hydrocarbon in tankage. As a result, upstream hydrocarbon owners and producers, who may not operate a refinery, have the capability and flexibility to upgrade the value of the hydrocarbon they have purchased by addressing numerous problems at once, such as removing naphthenic acid, metals, and asphaltenes.

The advantages of bulk tank liquid-liquid extraction embodiments described herein are multiple. For example, the process can be performed outside of a refinery in a terminal; it can permit treatment of greater volumes of crude hydrocarbon; and it allows for flexibility on treatment options (e.g., typical process units are limited by location and lineup of the units). Naphthenic acids, moreover, are detrimental to generic refinery processing units, so it is beneficial to remove naphthenic acids before the crude hydrocarbon enters the refinery. Additionally, the embodiments of the present invention can also more efficiently de-salt and minimize corrosion.

BRIEF DESCRIPTION OF THE DRAWINGS

FIG. 1 is a schematic diagram of an exemplary system for performing the liquid-liquid extraction in bulk tankage methods described herein.

DETAILED DESCRIPTION OF EXEMPLARY EMBODIMENTS

Embodiments of the system that performs the liquid-liquid extraction comprise numerous pieces of equipment. Certain pieces of equipment, components, and features of these embodiments are described in more detail below.

According to certain embodiments, and in general reference to FIG. 1, the system 100 comprises a main bulk processing tank 10 (also referred to herein as bulk storage tank, storage tankage, bulk tank, liquid-liquid extraction unit, or the like) where the liquid-liquid extraction occurs. The size of the tank can range from 1,000 barrels (bbls) up to and including 1,000,000 bbls. Typically, the liquid-liquid extraction of the present invention is performed as a batch process, where the hydrocarbon does not move once it arrives in the bulk storage tank (e.g., from a raw/crude hydrocarbon stream 30), until the completion of the process. Liquid-liquid extraction processes described herein can be performed in any size storage tank that is feasible to be built.

According to certain embodiments the storage/processing tank 10 has the following features. The processing tank 10 may or may not comprise a top enclosure, such as a floating roof, depending on the type of processing performed in the unit. Generally, the processing tank 10 will not comprise a floating roof, either internal or external, if the solvent mixture is introduced via misting process. This is to allow for a head space and room for processing equipment associated with a misting system. However, if the solvent mixture is introduced via circulation loop, then the processing tank may comprise a top enclosure, such as a floating roof.

In certain embodiments, an electrical current source is incorporated or attached to the floating roof of the processing tank. The electrical current source may be arranged as a caged grid of electrical probes. Such grid system covers the entire under portion of the floating tank. A probe system is equally distributed and connected to the floating roof, and the volume or number of probes in the system are dependent upon their voltage and amperage distribution. In practical terms, the electrical current source for the floating roof generally is akin to electrical current sources used an incorporated in desalter units. Desalter units use electrical current sources to drive out brine water quickly from incoming crude. The electrical current source heightens the polarity of the salt laden water and increases the speed of separation. Similarly in the present system, the electrical current source incorporated into the floating roof can be used to accentuate, accelerate, and make separation more efficient.

By way of example here, once the solvent mixture has begun to be pumped off (after introduction to the hydrocarbon and a few hours hold time), the electrical grid system located at the top of the tank can be placed on a "pulse" system to expedite the separation of the solvent from the hydrocarbon. The electric pulsing will also encourage the extraction of slightly polar constituents from the hydrocarbon. It promotes a cleaner break between hydrocarbon and solvent, while maximizing the extraction of problematic polar constituents.

The processing tank 10 may further comprise a heating system. The heating system may be installed in the bottom of the tank or vertically along one or more sidewalls of the tank, or a combination of both. The heating system comprises either a hot oil or steam coil system in order to allow the tank to be heated to temperatures of at least 100° F. up to and including 200° F. (advantageously, the system will heat to a temperature ranging from 130° F. up to and including 160° F., or 140° F. up to and including 150° F.), if desired for adjusting hydrocarbon viscosity and increasing contact efficiency between the hydrocarbon and additive streams (e.g., solvent mixture). The storage tank may comprise a circulation loop, and heat may also be applied via heat exchangers on the circulation loop.

The processing tank 10 may further comprise relief valve systems. The relief valve systems may comprise a system configured to route light end vapors and nitrogen to a light ends recovery tank or straight to thermal desorption unit for BTU recovery. Such relief valve systems may also incorporate or work in conjunction with vapor recovery systems, which are configured to recondense light end vapors. The inclusion of such system allows for flexibility of taking in low flash hydrocarbons and adding nominal amounts of heat without the loss of the hydrocarbon. This vapor recovery system and thermal desorption safely routes any $H_2S$ or mercaptans that reform in the acid phase for reaction into productive products or to the thermal desorption to be utilized for BTU recovery.

The bottom of the processing tank may further comprise a gas sparging system (e.g., for nitrogen/air) in order to "nitrogen strip" light ends to the recovery tank, if required. Including this feature allows for flexibility if electing to intake low-flash hydrocarbons. The gas sparging system may also be configured to inject steam into the processing tank.

The inside of the processing tank 10 may comprise a corrosion control coating throughout to minimize corrosion due to extreme pH swings. If the temperature within the tank is kept below 150° F., then both caustic and acid corrosion is only nominally invasive to carbon steel. However, certain processing techniques described herein may require higher temperatures, which could increase the possibility for corroding the inside walls of the tank. Using a corrosion control coating could mitigate this concern.

In certain embodiments, the floor and footings of the processing tank 10 are installed and configured to be at a slight angle leading to a deep sump in order to facilitate gathering of the liquid being used for extraction with ease—without pumps also sucking oil. In other embodiments, a flat floored tank with a small sump can be utilized.

The processing tank 10 may further comprise a high draw for pumping off finished product to a product tank. Finished product may alternatively be pumped from sump or low draw. A high draw is advantageous because it can avoid pumping off any small layer of emulsion at the interface of oil/liquid being used for extraction. The processing tank 10 may further comprise a weir installed at the sump. The weir can minimize hydrocarbon vortexing with the solvent when the final quantities of solvent are being pumped off.

According to certain embodiments, the system comprises a misting system connected to or integrated in or with the storage tank 10. The misting system is configured to evenly distribute the liquid being utilized for extraction (e.g., caustic-dosed solvent mixture) in an even layer across and upon the total surface area of the hydrocarbon at the top of the tank. A misting system may be incorporated or installed according to various options, described as follows.

In certain embodiments, the misting system may comprise numerous misters (or mister heads) that produce a droplet size of 15 to 50 microns. The misters are attached to piping emanating from the floor of the tank 10. The piping system is evenly distributed throughout the tank. The pipes lead from a feed system installed in the foundation of the tank, leading to individual pipes that measure in length so as to extend higher than the highest safe fill of the tank in the additional head space allowed. Each pipe ends at a header system, at which the plurality of misters are installed. The misters are configured and positioned to point upwards, away from the hydrocarbon contained in the storage tank. In this manner, when misting occurs, it creates a fog that will evenly lay down over the entire surface area of the hydrocarbon. The pipes may be braced at the floor and footings can be engineered to support the additional weight of the piping and liquid being pumped.

In certain embodiments, the misting system is installed in the head space of the storage tank 10 and braced at the roof with an additional truss system to support the weight (the roof itself would not likely be able to support the weight of the misting system itself). According to this configuration, the misters are configured and positioned to point downward toward the hydrocarbon. The misters are further configured to spray in a pattern that completely covers the surface area of the hydrocarbon. The misters would still produce droplets having size within the range of 15 up to and including 50 micron. In embodiments in which a misting system is installed in the head space of the processing tank, the tank may comprise an infrared foam indicator in head space as well, like those that may be used in coke drums. Regardless of the misting system's configuration, it may comprise a heat exchange feature configured to heat the liquid solvent mixture being introduced to the hydrocarbon. As explained in more detail below, solvent mixture may be pumped from a separate storage unit, and the heat exchange feature can heat the solvent as it travels from the separate storage unit to the misting system. A heated solvent mixture can speed up the reaction with the hydrocarbon.

In certain embodiments, a sprinkling system substitutes for the misting system. The sprinkling system is installed at the roof with a truss system. With a sprinkling system, however, the micron size of the liquid droplets would be larger than with a misting system. As a result, distribution and surface area contact of solvent mixture onto hydrocarbon may not be as effective with the sprinkler system, as compared to the mister system.

As mentioned previously, in certain embodiments, the system comprises a circulation loop for distribution and delivery of the solvent/caustic mixture. When electing to use a solvent mixture circulation loop, mix valves and a vortexing nozzle sparging system are advantageously used in combination. The circulation loop may be constructed, installed, and incorporated as a permanent feature or it can be included as a temporary loop. The temporary loop allows for the injection of solvent ahead of the pump (e.g., from solvent tank 20). Pump impellers may be incorporated in the tank to act as a blender. Impellers may be tied back into a sparging system within the bottom of the tank 10. For a faster, more efficient blending and contacting of the solvent mixture with the hydrocarbon, the system may comprise numerous circulation loops around the diameter of the tank. Incorporating a plurality of circulation loops can maximize exposure between solvent and hydrocarbon.

Each circulation loop may further comprise additional features and components. For example, as mentioned above, a circulation loop may comprise a heat exchanger, which is configured to heat the hydrocarbon before solvent is injected. Heating the hydrocarbon lowers its viscosity, which helps to increase contact between solvent and hydrocarbon.

Each circulation loop may comprise mix valves. The mix valves are configured to mix solvent mixture and hydrocarbon during transport through the circulation loop. Mix valves may be located at one or more locations along the path of a particular circulation loop. The processing tank may further comprise a vortexing nozzle/sparging system that allows for the hydrocarbon to further blend and contact with the hydrocarbon residing in the tank.

In certain embodiments, draws leading to the circulation loop are located high on the tank (e.g., above the midpoint of the tank or at a location in the upper half of the tank). Such configuration allows for a more complete exposure of the hydrocarbon to the solvent mixture within the tank, which could mitigate or eliminate the need for the vortexing nozzle/sparging system. Notwithstanding, certain embodiments feature high draws to the circulation loop coupled with a vortexing nozzle/sparging system. If locating high draws well above the internal floating roof legs, check valves should be installed directly next to the tank in order to minimize back flow of oil into the tank when volume of the tank has been dropped.

The processing tank 10 may further comprise a piping system for drawing water and/or solvent mixture from the tank, not only at the sump. Such piping system may comprise repeated draws, equidistant from one another (e.g., every 6 inches or every foot), in order to draw water from the top of the tank, when the tank is in fuel oil treatment service and solvent is drawn from the top.

As mentioned previously, the processing tank 10 may comprise a sparging system at the bottom of the tank with vortexing nozzles. Such sparging system provides additional blending of solvent/hydrocarbon into hydrocarbon within the tank. The sparging system may also be utilized to blend the solvent mixture and/or to allow for blending of a steam/solvent mixture.

The processing tank 10 may further comprise a nitrogen purge system for the head space of tank 10. A nitrogen purge system is generally for safety purposes if a misting system is included. In certain embodiments, nitrogen is injected into the head space of the tank to keep the vapor space inert. Accordingly, the nitrogen purge system is a safety feature to clear the head space of gas, if necessary.

According to certain embodiments, the system 100 comprises a solvent bulk storage tank 20 dedicated for storage of clean liquid solvent meant for the liquid-liquid extraction process. The liquid solvent may comprise water, amines, organic solvents (e.g., acetone or any type of alcohol such as ethanol or isopropyl alcohol), or combinations thereof, designed to facilitate liquid-liquid extraction. As used herein, the terms solvent and solvent mixture refer to the liquid injected or introduced into the bulk storage tank, which reacts with the hydrocarbon to extract acids and other undesirable materials from the hydrocarbon. In certain embodiments the solvent may consist of water only; in other embodiments the solvent mixture may comprise multiple materials, including a plurality of water, amines, organic solvents, and/or glycerin. The solvent bulk storage tank 20 can vary in size depending on the volume of solvent mixture needed to process the hydrocarbon in the processing tank. The solvent storage tank 20 can have an optional floating roof if the solvent mixture being used requires vapor control.

The system 100 may further comprise separate storage tanking and injection systems, as necessary, to account for other liquid components that may be required for the liquid-liquid extraction. For example, water, caustic, acid, and/or peroxides may be useful liquid components for the extraction techniques described here. The system, therefore, may comprise a plurality of storage tanks, one each for these other liquid components. The system also comprises injection systems corresponding to these liquid components and integrated and incorporated with the plurality of other storage tanks. The injection systems are configured to inject liquid components necessary for liquid-liquid extraction into either the processing tank directly, the solvent feed line, a misting system feed line, or a circulation loop.

In certain embodiments, the system 100 comprises a light ends recovery tank. In case the process has initial light ends (e.g., naphtha), vaporized light ends and nitrogen are collected at the top of the processing tank 100. The light ends vapor is recondensed by a vapor recovery system and then pumped back into the bottom of the tank. The light ends recovery tank comprises a constant water table in order to solubilize any solvent that may vaporize and keep it separate from the light ends vapor. The light ends recovery tank also has a relief valve in order to relieve the excess nitrogen to the flare system. Condensing light ends vapor can also take place in an exchanger, in the alternative.

$H_2S$ and mercaptans in the caustic phase of treatment are bound as a salt. However, in the acid phase of the process, they are re-released as a gas both on the raw crude and any salts that were not fully extracted along with the extracted material. In certain embodiments, the vapor recovery system is routed through a thermal desorption unit for initial heat and energy recovery. The thermal desorption units have scrubbers that minimize ultimate emissions.

The addition of acid to a basic environment is exothermic and springs $H_2S$ and mercaptan gases. Certain embodiments may be capable of self-heating through this exothermic reaction. In such embodiments, acid is added slowly to allow for a slow reaction and to control the exothermic reaction and to control the production of $H_2S$ and mercaptan gases. Correspondingly, nitrogen used in the sparging system creates a small amount of positive pressure on the tank to continually purge the gases from the tank into the vapor recovery system for incineration and energy recovery. The thermal desorption system may be lined up with and connected to the spent solvent system for continuous feed. Regulation mechanisms can adjust the feed flow depending upon the heat needs for the system, as it varies due to batch operation.

The vapor recovery system may also be connected and integrated with the spent solvent system. The spent solvent tank can have a line up for introduction of spent glycol, spent caustic, and spent amines which all have some level of BTU value. According to the processes described herein, water is picked up from the crude. Any additional materials such as amines, glycols, or spent caustic will also have additional water. The thermal desorption unit can create steam from this water content. Such steam may be routed to heat exchangers in the bulk tankage heating system in order to recover heat. Once condensed, it can be sent to a wastewater treatment plant as relatively clean water for outfall or to a make-up water system for recirculation into a cooling water system or into the solvent mixture. The thermal desorption unit allows for the system to be relatively self-sustaining on energy consumption. Being a renewable system that promotes a high level of water recycling and conservation is an unassailable advantage of the present invention.

In certain embodiments, the system 100 comprises recovery and recycling subsystems. Liquid-liquid extraction processes described herein may produce spent water. A recovery and recycling subsystem may comprise water treatment facilities. For example, water treatment facilities may utilize advanced oxidation units and/or reverse osmosis skids to extract the majority of solubilized metals, salts, sulfurs etc. in the spent water. Although not a critical requirement, without a water recycling subsystem, the amount of water that would be consumed and that would need to be disposed would be significant and create economic inefficiencies. Other recovery systems for solvents, amines, and other liquid components used in the liquid-liquid extraction may be incorporated as well.

The components and features described above can be used to perform liquid-liquid extraction in bulk tankage, regardless of the size of the tank. FIG. 1 illustrates an exemplary embodiment of the system designed to perform the liquid-liquid extraction methods described herein.

According to an embodiment of the present invention, to extract naphthenic acid in bulk tankage, naphthenic acid is reacted with NaOH (caustic) or KOH. This reaction converts the various molar weight naphthenic acid to sodium or potassium naphthenate (soap). The reaction also creates an emulsion in crudes or heavy fuels that, until now, was considered impossible to remove or break in any type of traditional processing unit. Any type of severe blending, such as the oil passing through a pump impeller, would further increase the severity of the emulsion in the presence of water alone.

Naphthenic acid can be completely converted to naphthenate with various strength caustic—e.g., full strength, 50% neat, or caustic dosed within a solvent mixture. Caustic can be dosed with solvent mixture on the run down from the vessel (e.g., raw/crude stream 30) to the storage tank 10 with mix valves in line to ensure contact. Dosage will vary depending upon the incoming TAN. Lab titration may be used to specifically define the required dosage, but generally, a point of TAN will require 1 mg KOH/kg solvent mixture, approximately 0.1% full strength caustic, to reduce the TAN to non-detect. In certain embodiments, a sparging system installed with a circulation loop can allow for the introduction of additional caustic and blending, if the rundown dosage is not sufficient. When using a solvent that is heavily laden with naphthenates and asphaltenes, the solvent will have a very dark color, almost indiscernible from the color of the oil, except for a prevalent amber tint. As the rinse progresses and the quantity of naphthenates and asphaltenes being extracted are reduced, the color of the solvent will move to an amber color.

Once the TAN is brought to a non-detect or acceptable level, it is in the form of naphthenate soap, which will, if exposed to water alone, create a severe emulsion. Because soap is miscible in both oil and water, any type of agitation will make the emulsion very difficult to break. However, water and soap can be displaced or a solvent mixture can minimize the emulsion and allow the naphthenates to easily migrate to the solvent mixture and extract from the oil. A solvent mixture of water and alcohols can minimize the emulsion and encourage the naphthenates to migrate to the solvent from the oil, along with promoting asphaltenes to solubilize instead of remaining at the oil/water interface.

Water and/or solvent mixture will continuously displace in the bottom of the tank. According to certain embodiments, the water and solvent mixture is pumped off to a storage tank for naphthenic acid and asphaltene recovery. After naphthenic acid and asphaltenes are recovered, the solvent proceeds to reverse osmosis water treatment skids. The reaction between caustic and crude or acid and crude generally occurs at ambient temperature; however, in certain embodiments, tanks may be heated with steam coils or hot oil. Steam coils or hot oil may be located vertically along the tank walls or at the bottom of the tank. The steam coils or hot oil heat to a temperature ranging from about 100° F. up to and including 180° F. The heating temperature depends on solvent temperature tolerance. It has been observed that this type of heating facilitates the contacting of liquids and a faster displacement due to improved viscosity of the oil.

In certain embodiments, a misting system is installed in the top of a bulk storage tank. It can be installed through a "sprinkler type system" comprising misters. A plurality of misters may be installed throughout the top of the tank, directed downward toward the hydrocarbon contained in the tank. The misters are configured to create fine droplets of water, for example, as small as 5 to 15 microns. The misting system may be installed as part of a "truss system" on the outside of the tank, in order to support the weight of the system.

Certain embodiments of the liquid-liquid extraction system comprise pipes that emanate from the floor and spread vertically and evenly throughout the tank. Misting heads are connected to terminal ends of the piping and are configured to point upward, or directionally away from the hydrocarbon stored in the tank. The water/caustic mixture may be pumped upward through the pipes and ultimately sprayed out into the tank via the misting heads. In this configuration, the positioning of the misting heads upward enables the water/caustic mixture to be sprayed or misted into an upper portion of the tank, creating a fog-like header that then lays down over the complete surface area of the tank. In certain embodiments, the tank will not be enclosed by a floating roof or top-side lid. This helps to ensure that the upward spray from the misting heads is not impeded and thus the water/caustic mist can lay down evenly. When the misters are pointed downward, they can have a distinct spray patterns that might or might not overlap as the hydrocarbon level in the tank rises and falls. This can lead to uneven coverage.

When misting from the top to the bottom with a solvent mixture, various solvent mixtures are effective. The addition of glycerol alcohol, for example, is useful to decrease the gravity enough to allow the solvent to drop through the hydrocarbon and draw from the bottom of the tank, while extracting the naphthenates. Mixtures of water, glycerol, and ethanol, isopropyl alcohol ("IPA"), methanol, acetone, or other polar water soluble solvents are effective. Water and glycerol alone, without the addition of an additional alcohol, will also be effective.

The fresh water/solvent rinse can mist for as little as 12 hours or up to 120 hours (5 days), depending upon the initial level of TAN. Generally, the higher the initial TAN, the longer the rinse will need to go. In some embodiments, the misters may be set to allow for 10% to 20% of the total capacity of hydrocarbon misted over the applicable application period.

In certain embodiments, a misting system is not present. In such embodiments, the inclusion of a circulation (or sparging) system may be useful. With a circulation system, the solvent is pre-dosed with caustic or acid and introduced before a mixing valve to allow for excellent contact of the solvent and caustic or acid with the oil. The solvent dosed with caustic can initially be introduced to the crude on the run-down from the provider (e.g., a ship or barge) to the tank, or the caustic or acid can be introduced via the circulation loop at the tank. The appropriate dosage of caustic or acid and appropriate amount (percentage) of solvent that should be used is dependent upon final specification requirements. A solvent mixture can be highly effective in picking up the majority of naphthenates and asphaltenes in a single rinse. If initial TAN or asphaltene is particularly high, then it can be advisable to increase the percentage of solvent as the solvent can have a saturation point and/or adjust dosage of caustic (e.g., elect to reduce caustic dosage by 25% up to and including 75%).

In dealing with fuel oil, where the gravity is less than 10, the caustic may be injected into a steam header/sparging system installed on the floor of the tank. According to such embodiments, the caustic is dispersed throughout the steam and distributed throughout the tank. The steam condenses back to solvent mixture and displaces itself along with the soap at the top of the tank, where it is drawn off through a series of high draws. In this instance, distillation would need to occur in order to remove portions of the water in order to keep solvent/water ratio in balance.

According to certain embodiments, an initial strip/extraction with solvent, if dosed with caustic at full strength in order to account for all of the naphthenic acid, may be sufficient to remove the majority of naphthenates. However, it is possible that even still there could be a small percentage of naphthenates or asphaltenes left behind. A second or third wash will continue to remove the remnants of naphthenates and asphaltenes. The pH of the oil after the initial strip will have been reduced. It is useful to continue to dose solvent with caustic to at least extent to keep the pH of the solvent above about 11. And, of course, on secondary or tertiary strip cycles, the dosage will be reduced stepwise because some of the naphthenic acid has already been converted into naphthenate form from prior stripping cycle(s).

Once the desired quantity of naphthenates and asphaltenes is removed, the same solvent can then be used to revert the remaining quantity of naphthenates back to naphthenic acid. For example, according to certain embodiments, the same solvent on a circulation loop can be dosed with an acid (strong or weak acids will work). The acid can be injected along with the water or solvent in the misting system or at full strength through the sparging system and circulation loop. The naphthenates will revert back to a naphthenic acid, and any remaining metals will create metal salts that are washed out with the solvents. In the acid phase, no further asphaltenes will be extracted. In the acid phase, there will be a reduction of basic nitrogen as well.

Again, at this stage of the process, there should only be small quantities of naphthenates present; therefore, the dosage of acid required to revert the naphthenates back into naphthenic acid will be minimal. For this reversion step, it is useful to dose the solvent mixture to a pH of around 4. As the naphthenates are converted back, the pH of the solvent dropping out will rise. The dosed solvent should continue to circulate until the pH stabilizes. The basic nitrogen number should be monitored as well because it also consumes acid for neutralization. The conversion back to a naphthenic acid is not instantaneous. Once the conversion reaction is completed, any excess sodium, potassium, or calcium will have formed a water-soluble salt and will migrate to the solvent phase and drop out with the solvent. Once the soap is converted back, the stable emulsion will no longer be present. The previously emulsified water and solvent will now quickly break out along with the sodium and chlorides. The oil now will have a new lower TAN and lower % asphaltene, while being water, sodium, and chloride free. A final solvent wash with no chemistry may be required to remove residual levels of strong acid.

There are a number of ways to determine how much of the naphthenates has been removed. One way is by observing the actual recovery of naphthenates on recovery skids or in a lab, which involves washing the hydrocarbon with solvent and then adding acid to a known amount of solvent and observing the naphthenic acid produced.

In certain situations, the only desired result for crude extraction is to reduce the overall level of naphthenic acid in order to create "low TAN" crude or bunker fuel. In such situations, a single solvent wash may be sufficient. If a secondary desire is sulfur removal, then it is recommended to remove as many naphthenates as possible because the presence of acids (i.e., naphthenic acid) can minimize the effectiveness of sulfur removal processing steps. Therefore, if sulfur removal is desired, in addition to producing low-TAN crude, then follow-on solvent washes may be required.

During extraction, it is useful to continuously observe pH. If the pH begins to drive below about 11, an emulsion can develop due to saponification. If the pH drives lower, the soap may begin to lather. To counteract this, it can be useful to add strong base with the solvent mixture—that will minimize lathering and increase efficiency of the extraction.

For crudes that are holding excess water or for crudes known to have desalting difficulties, a solvent mixture wash with slightly acidic water/solvent can often help to "pre-wash" metals and salts stabilized in the crude that can cause desalting difficulties. For any crude, it is helpful to always check a full slate of metals and TAN level. Incoming crude with excessive levels of sodium, calcium, iron, magnesium, copper, or other metals will most likely be holding an excessive amount of naphthenate soap that developed naturally in the earth's structure. The presence of excessive metals is typically an indicator of naphthenate soap and typically does not reflect in the TAN, but will generally lead to recovery of additional naphthenic acid. A high metal number is an indicator the crude will have major desalting issues.

Solvent Mixtures

The solvent mixtures referred to above and used in the embodiments of the extraction processes described herein may comprise water in combination with various alcohols. In bulk tankage and the premise of circulation and contact, ultimately, the solvent mixture must be able to drop to the bottom of the tank. Most alcohols have an API or specific gravity that would not allow for it to drop to the bottom. Thus, embodiments of the present invention use glycerol, which has a low API and is water soluble/miscible in water. The inclusion of glycerol not only will aid in extracting soap, it will also give the solvent mixture a low enough gravity to drop out of even heavy fuel oil mixtures.

In certain embodiments, the solvent mixture may also comprise one or more of ethanol, acetone, IPA, or methanol, in addition to the water/glycerol mixture. The addition of these alcohols can increase effectiveness of the solvent when extracting the soaps. The solvent mixtures must comprise water in an amount significant enough to cause alcohols to want to remain with the water phase, as opposed to solubilizing into the hydrocarbon. Useful solvent mixtures comprise water in an amount of at least 30% by weight.

For embodiments introducing a solvent mixture by misting, the system should continue to mist at 10 to 20% of the total volume of the oil volume per day until the presence of naphthenic acid is negligible in the recovery skids. The solvent needs to continuously have caustic present in order to minimize or eliminate the saponification effect. The caustic can be dosed either neat into the oil initially on the run down to the storage tank, neat on a circulation loop, or dosed within the actual solvent mixture.

For embodiments that batch treat crude with the solvent mixture or that introduce the solvent mixture on a circulation loop, the system should provide the solvent mixture in an amount of 10% to 40% of the volume of oil. Increasing the volume of solvent increases contact ability, increases efficiency of break between oil and solvent, and decreases the percentage of naphthenates absorbed. In these embodiments, for the initial solvent wash, caustic is dosed at a level sufficient to account for the conversion of the desired amount of naphthenic acids to soap. On subsequent washes, the solvent needs to have enough caustic added in order to bring the pH up to above 11 in order to minimize the lathering effect of soap. The initial solvent mixture can either be added into the oil on the rundown to the storage tank or via the circulation loop.

Heating

The reaction of naphthenic acid with caustic is relatively instant and requires no heat. The solvent absorbing the soap also occurs at ambient temperatures. The addition of nominal levels of heat, however, can be useful. For example, heating the oil affects its viscosity, which can allow for better contact with the solvent and the break of the solvent from the hydrocarbon. Heating the solvent can help with washing efficiency. A nominal level of heat (e.g., about 100° F. up to and including 150° F.) can minimize solvent wash time. It is important, however, to be mindful of the actual boiling point of the hydrocarbon, as well as the boiling point of solvent. Glycerol, for example, has an extremely high boiling point, but ethanol and methanol do not. If heating temperatures applied during the process rise above respective boiling points of hydrocarbon or solvent materials, then a clean break between the solvent and hydrocarbon may not occur. When using circulation loop techniques, as opposed to misting techniques (e.g., to introduce the solvent mixture to the oil), it can be useful to enclose the top of the storage tank (e.g., with a floating roof) so as to minimize or eliminate vapors in a head space of the tank.

Caustic and Acid Dosage

The initial dose of caustic can be calculated based on the TAN of the crude. For example, a TAN of 5.4 is actually reporting the mg/g of KOH required to fully neutralize the hydrocarbon. It fundamentally translates to 1,000 ppm of KOH per point of TAN. Since KOH is approximately 76% strength of NaOH, when utilizing sodium hydroxide, your actual dosage can be reduced slightly to account for the increase in strength.

On subsequent dosages, to the extent required, the caustic is dosed into the solvent mixture at an amount sufficient to make the solvent mixture have an elevated pH above 11. A simple lab pH test checking the original pH of solvent mixture and slowly adding small quantities of caustic until the pH of the known quantity of solvent reaches above 11 provides the rate needed to set caustic pumps. It can be useful to also check an actual sample of the hydrocarbon/solvent mixture. If the oil has a "milkshake" creamy appearance and the solvent appears to have created an emulsion that is slow to break, then the pH is not high enough. In such situation, the solvent mixture should continue to circulate while gradual amounts of caustic are added in order to raise the pH to a desired level that eliminates the emulsion and creamy appearance.

Determining acid dosage required to convert any remnants of soap back to a free oil soluble naphthenic acid is done through observing pH changes. The first step comprises checking the original pH of the recovered solvent, and then slowly adding acid to the sample while continuing to observe pH. The appropriate acid dosage is the amount necessary to make the pH of recovered solvent equal to about 4.5 to 5. This dosage of acid is then injected into the solvent mixture bound for the circulation loop. Converting the soap back to naphthenic acid should begin upon introduction of the acid dosed-solvent mixture, but a complete conversion can take up to 24 hours. During circulation, it is advisable to take samples of the oil/solvent solution. Allow the sample time to sit so that the solvent mixture breaks from the oil, and check the pH of the solvent. As the acid reacts with the naphthenates, the solvent pH will rise. As long as the solvent pH is below 6, there is still active acid. If the solvent pH gets above 6, although still an acidic environment, it can be useful to further add a small amount of acid to expedite the conversion. As the pH of the solvent goes up, the TAN of the crude and calculated weak acid will also rise due to conversion. The basic nitrogen will begin to lower in the crude as it reacts with strong acid.

Exemplary Liquid-Liquid Extraction Process

The embodiment illustrated in FIG. 1 is configured to perform liquid-liquid extraction in bulk tankage. An exemplary liquid-liquid extraction technique that can be performed using the system illustrated in FIG. 1 is described below.

Step 1: If the hydrocarbon has a low flash, the first step comprises a "light distillation" utilizing nitrogen to separate and distill off the light ends to a light ends recovery tank. If the processing tank 10 comprises a floating roof, then it should include nitrogen purge valves for safety. This process may also be performed in a processing tank lacking a floating roof. This initial step of separating the light ends may also be skipped depending on the end use of the hydrocarbon (e.g., if it were bound for market at bunker fuel). Next, the hydrocarbon is heated to a temperature about 10° F. above the desired temperature the liquid-liquid extraction will be performed at. Once the temperature has reached this point, the nitrogen purge valve is opened and nitrogen feed is pumped into the bottom of the processing tank through the sparging system. The light ends that vaporize are pushed to the light ends recovery tank and re-condensed. This first step of the process is not generally suited for a hydrocarbon with excessive light ends.

Step 2: The water/solvent mixture dosed with caustic (e.g., about 30-50% KOH or NaOH solution, typically 50% solution) in an amount prescribed based on the Total Acid of the hydrocarbon (e.g., 1,000 ppm per every point of TAN) and injected into the misting system and/or circulation loop system (e.g., one or more circulation loops incorporated with or into the processing tank 10, as described above) via solvent tank 20. Along the way to the misting system and/or circulation loop system, a heat exchanger heats the caustic-dosed solvent mixture. The misting system and/or circulation loop system distributes the caustic-dosed solvent mixture in the processing tank, ultimately contacting the hydrocarbon to the solvent mixture. Liquid-liquid extraction proceeds via the reaction between the caustic and the hydrocarbon, converting the naphthenic acid into naphthenates and utilizing polarity to extract asphaltenes. (Note: If the hydrocarbon has no light ends, this would be considered step 1.)

Step 3: If TAN and asphaltene removal is the only desired outcome, then the solvent is extracted into an extracted solvent tank 40, where the extracted solvent is dosed with acid and used to revert the naphthenates back into naphthenic acid and adjust the asphaltenes polarity enough to excise themselves from the solvent and float Step 4: If the hydrocarbon requires an additional sulfur removal step, then the hydrocarbon is reacted with suitable oxidizing materials to wash the sulfur out. Performing the acid wash before a suitable oxidizing reaction would mitigate the effectiveness of the oxidation step. Further optional steps may be taken for spent water recycling and naphthenic acid recovery.

It should be appreciated that the systems and processes described herein are advantageously useful to extract a number of undesirable constituents from a hydrocarbon stock. Notably, that includes naphthenates/naphthenic acids, metals, and salts, but the processes extract, more generally, constituents in the hydrocarbon that are polar. The pH of the solvent in the caustic phase allows hydrocarbons that have any level of polarity to migrate to the solvent to be extractable with naphthenic acid. Additionally, the processes and systems described herein can isolate and extract the following array of undesirable materials: asphaltenes, phenols, metals, hydrogen, oxygen, nitrogen, hydrogen sulfide and mercaptans, chlorides, and waxes, among others.

Asphaltenes tend to migrate to high pH solvent. They become miscible/soluble in the alcohol solvent. Asphaltenes have a polar tail, which is why they often cause emulsion issues at a desalter especially in conjunction with naphthenic acids. The high pH solvent is conducive for the asphaltenes of all carbon chain lengths to migrate to the solvent. Migration occurs in the high pH environment, where the polarity of the solvent and the non-polarity of the oil is at its closest.

Phenols are not typically prevalent in crude oil; however, they do appear on occasion, deriving from specialty chemicals being placed downhole or slop oil or re-run being reintroduced into crude for refining along with some naturally occurring. Phenols are soluble in alcohol and will migrate to the solvent during the extraction processes described herein.

Most metals in the caustic phase will either be present in the form of a salt or a naphthenate and tend to migrate to the solvent phase. Metals are recovered in the acid phase of the extraction process as any remaining naphthenates not extracted in the caustic phase are converted back to a naphthenic acid, and the metal subsequently forms a salt that is polar and migrates to the solvent.

It has been stated that the processes and systems described herein extract salts and acid. Accordingly, inorganic chlorides will reflect in either a salt or an acid. They are predominately highly water soluble and thus extractable in the water-solvent mixture. Organic chlorides, however, tend to migrate to the oil phase. Industry desalters are relatively ineffective at removing them. Organic chlorides are man-made and should not ideally exist in crude, but nevertheless are often found in crude, in low grade fuel oil, and in bunker fuel. The processes described herein have an extraction effect on some of the commonly found organic chlorides, such as chloroform or variants of vinyl chloride, either due to a reaction with caustic forming a water, or alcohol soluble salt, or solubility with ethanol or alcohol in general.

All refiners, regardless of their crude slate, must deal with the components of crude that cause a variety of downstream issues. For example, corrosion and fouling throughout the refinery are a large concern. Salts, nitrogen, oxygen, metals, naphthenic acid, strong acids, $CO_2$ and asphaltenes are major causes of both. By extracting the majority of these constituents using the processes described herein will meaningfully reduce fouling and corrosion throughout the refinery.

For example, many units in a refinery function with a catalyst reaction. Metals, nitrogen, and oxygen are primary poisons to all these catalysts. Refiners also have ancillary units throughout the refinery to deal with removal of $H_2S$, mercaptans, and $CO_2$ using amines, caustic, oxidation, or some type of catalyst. Naphthenic acids, naphthalenes, metals, asphaltenes all effect the final product quality specifications and, more specifically, test results that indicate emissions issues. The extraction of these undesirable materials in advance of refinery processing (1) reduces workload and degradation on downstream units designed to deal with such materials, (2) yields downstream production of cleaner products, and (3) reduces harmful environmental emissions attributable to the various downstream refining processes.

While crude has been mentioned throughout this description, the systems and processes described herein are not limited to crude. The embodiments described herein are effective on hydrocarbon inputs, products, and feed streams generally, if the API gravity of the stream is higher than that of the solvent mixture, which can range from a 5 to a 15 API gravity depending upon the ratio of glycerol in the solvent mixture. Generally, the API of the solvent mixture may fall within the range of 7 up to and including 9, which is typically advantageous for dealing with heavy crudes. The solvent mixture is effective at a higher API, however, where the water/alcohol-to-glycerol ratio is higher. This is less common but can present itself with residue streams and clarified slurry oil, which can often have an API lower than the solvent mixture. In those instances, it may be advantageous to add a cutter to lift gravity of the product stream to increase effectiveness of the extraction process.

As mentioned, the systems and processes described herein provide potential downstream co-product/by-product benefits at downstream processing plants. For example, considering a fuel oil blend stock with a TAN over 100. A titration revealed the acid in the stream was a weak acid. Using the liquid-liquid extraction processes described herein, the acid was easily extracted. It is doubtful that such acid was a naphthenic fatty acid, which has been discussed above. Rather, it was more likely derived from an entrainment of some form of weak acid being used as a catalyst in a co-product stream. Pyrolysis gas oil streams are common co-products stemming from chemical plants being blended to bunker or fuel oil. They predominately have great properties but can have a few specifications due to entrainment or reaction that are unwanted. Using the embodiments described herein on non-crude streams have also proven effective.

The embodiments described herein provide further positive advantages for tank cleaning, rerun production and API separator sludge production. The processes described have a profound impact on future production and build-up of sludge throughout the refinery. Crude tanks, for example, develop a large heel of sludge that is primarily a combination of emulsified water, hydrocarbon with polarity issues, and metals. The embodiments of the present invention extract water, polar hydrocarbons, and metals, and thus will inherently minimize future build-up of sludge within a crude tank. Crude tank sludge is designated as hazardous waste with cradle-to-grave disposal implications pursuant to federal and state regulations. Most countries in the world also regulate crude tank bottoms with hazardous waste disposal regulations. Crude tank sludge is a major yearly source of reportable solid waste production at a refinery or terminal, and implementation of the systems and processes described herein can markedly reduce such waste.

Another positive advantage is the ability to rerun sludge to also help prevent build-up in equipment. A way to do this, for example, is to add and blend a caustic-dosed solvent mixture with the sludge to convert the sludge to reduce its viscosity and make it a pumpable material. Once it is pumpable, the treated sludge is transferred back into a processing tank to undergo the extraction processes described above. Rerunning sludge in this manner can help reduce solid waste disposal.

Product tanks similarly develop natural build-up and can, over time, develop a heel of sludge due to metals and incompatible portions of the product that tend to flocculate out. As with crude tanks, extracting metals and incompatible portions of crude will minimize the buildup of sludge in such product tanks. Most product tanks are designated hazardous waste with cradle-to-grave issues of their own. Product tank disposal is a major source of reportable solid waste production within a refinery on a yearly basis, and implementation of the systems and processes described herein can markedly reduce such waste A type of sludge of particular interest is API separator sludge, which is an emulsion, a tar like substance of heavy oils, metals, and water. It is a registered hazardous waste. The main source of API separator sludge is desalter water oil under carry. The embodiments of the present invention enable a refinery to bypass desalter processing, therefore severely minimizing the production of API separator sludge. API skim oil is the oil that instead of sinking and forming a sludge remains floating and is skimmed and re-routed to re-run or slop oil tanks. The major source of skim oil is a desalter as well. The skim oil system is open to the atmosphere and is a source of reportable emissions for a refinery. The elimination of desalters and desalter processing, as provided for by the present invention, can severely reduce the skim oil production.

Rerun or slop oil is the agglomeration of all oil that does not completely make it through the refining process and refiners must attempt to re-process. It must be fed slowly as its metal content, water content, cleanliness and incompatible portions of crude are a major source of upsets and subsequent products going off-spec thus creating additional re-run. Slop oil emulsions are designated hazardous waste. The EPA does not define the specific bounds for slop oil, so most refiners must consider the entire tank hazardous waste if they elect to dispose. Disposal is an expensive and reportable event. Most refiners seek to avoid disposal and opt instead to attempt to re-process, often with detrimental effects. Extracting metals, naphthenic acids, and incompatible portions of crude while the crude is in bulk tankage—according to the processes described herein—significantly increases desalter efficiency, which can severely mitigate the production of rerun or slop oil that refiners are effectively left to reprocess.

In addition to reducing waste, prolonging refinery equipment, and increasing efficiency and processing output, the inventive systems and processes described herein have multiple positive environmental impacts. The embodiments described herein have a positive and cumulative effect on fuel gas and natural gas consumption at refinery, quantity of wastewater and quality of water outfall at a refinery, actual fresh water consumed at a refinery, total carbon footprint and emissions at refinery, reduction of power consumed at pumps and compressors at refinery, improvement of carbon footprint and total emissions of all products produced at a refinery, as well as reduction of solid waste bound for disposal at a refinery. A total carbon footprint of a refinery not only accounts for power consumption, fuel consumption, water consumption, and emissions, but also encompasses incoming and outgoing materials and products for consumption within the refinery and material exiting the refinery for disposal or recycling. The systems and methods described herein minimize both incoming products and outgoing disposal and recycling operations—thus minimizing the complete carbon footprint of a refinery.

Examples of incoming reduction of footprint are delivery via vehicle of incoming specialty chemicals and commodity chemicals, such as scrubbing amines and cartridge filters, to be used throughout the facility to filter metals and incompatible particulates. Examples of outgoing reductions of the overall carbon footprint are solid waste production from tankage and API separators that include both the transportation and the subsequent incineration for little to no productive use. There will also be a reduction in spent amines that must be sent out for disposal or recycling. In sum, the cumulative benefits are measurable and accountable on water, air, and solid waste.

The invention claimed is:

1. A bulk tankage liquid-liquid extraction system, comprising:
- a bulk storage tank housing a static hydrocarbon, wherein the bulk storage tank comprises a corrosion control coating configured to minimize corrosion due to changes in pH;
- a solvent feed tank separate from the bulk storage tank;
- a conduit connecting the solvent feed tank to the bulk storage tank, configured to circulate a dosed caustic and solvent mixture into the bulk storage tank to contact the static hydrocarbon in the bulk storage tank, wherein a liquid-liquid extraction reaction occurs within the bulk storage tank, wherein the solvent mixture comprises 30-50 wt-% alcohol, 20-40 wt-% water, 20-40 wt-% glycerin;
- a naphthenic acid tank; and
- a sump unit located on the bottom half of the bulk storage tank and configured to pump out of the bulk storage tank a solvent extraction mixture that has extracted asphaltenes and polycyclic aromatic hydrocarbons from the static hydrocarbon after the liquid-liquid extraction reaction;
- wherein the bulk storage tank comprises a misting system installed in a head space of the bulk storage tank, the misting system configured to distribute micro-droplets of the solvent mixture across a top surface of the static hydrocarbon.

2. The system of claim 1, further comprising a heating unit installed at the bottom of the bulk storage tank, along one or more sidewalls of the bulk storage tank, or both, wherein the heating unit is a hot oil or steam coil system configured to heat the static hydrocarbon during the liquid-liquid extraction reaction completed inside the bulk storage tank.

3. The system of claim 1, further comprising a heat exchanger attached to the conduit, wherein the heat exchanger is configured to heat the solvent mixture during transport from the solvent feed tank to the bulk storage tank.

4. The system of claim 1, further comprising a sparging unit at the bottom of the bulk storage tank, wherein the sparging unit comprises a plurality of vortexing nozzles configured to blend the static hydrocarbon and the solvent mixture after the solvent mixture is circulating into the bulk storage tank.

5. The system of claim 1, wherein the sump unit is configured to pump naphthenates, asphaltenes, hydrogen sulfide, mercaptans, and phenols out of the bulk storage tank with the solvent mixture after the liquid-liquid extraction reaction.

6. The system of claim 1, further comprising a plurality of electrical probes connected to a roof on the bulk storage tank, wherein the plurality of electrical probes deliver electrical current into the static hydrocarbon inside the bulk storage tank.

7. The system of claim 1, further comprising a solvent recovery unit remote from the bulk storage tank configured to receive the solvent extraction mixture that comprises extracted asphaltenes and polycyclic aromatic hydrocarbons from the static hydrocarbon after the liquid-liquid extraction reaction and acid wash the solvent extraction mixture to form an acid washed solvent mixture.

8. The system of claim 7, wherein the solvent recovery unit is configured to acid wash the solvent mixture with HCl or H2SO4.

9. The system of claim 8, wherein the solvent recovery unit comprises a settling tank configured to receive the acid washed solvent mixture.

10. The system of claim 9, wherein the settling tank holds the acid washed solvent mixture for a period sufficient to convert naphthenate soap into naphthenic acid.

11. The system of claim 9, wherein the settling tank comprises shearing mixers.

12. The system of claim 7, wherein the solvent recovery unit comprises reverse osmosis skids.

13. The system of claim 12, wherein the reverse osmosis skids are configured to recycle the solvent mixture and capture phenols and polycyclic aromatic hydrocarbons.

14. The system of claim 7, wherein the solvent extraction mixture transported from the bulk storage tank to the solvent recovery unit comprises naphthenates and asphaltenes from the hydrocarbon stored in the bulk storage tank.

15. The system of claim 14, wherein the decanted solvent mixture transported from the bulk storage tank to the solvent recovery tank further comprises salts, metals, chlorides, hydrogen sulfide, mercaptans, phenols, and polycyclic aromatic hydrocarbons from the hydrocarbon stored in the bulk storage tank.

16. The system of claim 1, wherein the conduit connecting the solvent feed tank to the bulk storage tank is configured to circulate the solvent feed in a ratio amount of at least 10:50 by mass compared to the amount of the hydrocarbon in the bulk storage tank.

* * * * *